United States Patent
Tang

[19]

[11] Patent Number: 6,125,814
[45] Date of Patent: Oct. 3, 2000

[54] ROTARY VANE ENGINE

[76] Inventor: Hetian Tang, 1 East Street Caoqiao Town, Wujin City Jiangsu Proveince, China

[21] Appl. No.: 09/194,628
[22] PCT Filed: Mar. 10, 1997
[86] PCT No.: PCT/CN97/00015
  § 371 Date: Sep. 23, 1998
  § 102(e) Date: Sep. 23, 1998
[87] PCT Pub. No.: WO97/37113
  PCT Pub. Date: Oct. 9, 1997

[30] Foreign Application Priority Data

Mar. 29, 1996 [CN] China ................................ 96104446.2

[51] Int. Cl.⁷ .................................................... F02B 53/00
[52] U.S. Cl. ............................................................. 123/222
[58] Field of Search ..................................... 123/222, 231

[56] References Cited

U.S. PATENT DOCUMENTS 1,228,806  6/1917  Morris ...................................... 123/222
2,124,542  7/1938  Chisholm ................................. 123/222

FOREIGN PATENT DOCUMENTS 1011256  5/1977  Canada ..................................... 123/222
2525363  12/1975  Germany ................................. 123/222
3111873  10/1982  Germany ................................. 123/222

*Primary Examiner*—Michael Koczo

[57] ABSTRACT

The rotary vane engine of this invention includes a housing and a rotor. The housing is formed by a stator and front and rear covers. The rotor comprises hollow vanes set up in an inner space of the housing. The wall of the inner space and peripheral wall of the rotor consists of two pairs of symmetric intake-compression chambers and power-exhaust chambers. The volume of the power-exhaust chamber is larger than the intake-compression chamber. An inlet is mounted in the wall of the stator in the beginning of the intake-compression chamber and an outlet is mounted in the wall of the stator in the end of said power-exhaust chamber. In the upper and lower ends of the stator, there are two symmetric cylinders, there is a combustor consisting of separated combustion chambers in the cylinders respectively. In the wall of the cylinders, there are compressed gas channels and combustion gas nozzles coupled with the inner space. A high combustion performance with simple structure can be obtained and fully utilize expansion energy of combustion gas.

8 Claims, 2 Drawing Sheets

ROTARY VANE ENGINE

FIELD OF THE INVENTION

This invention relates to internal combustion engines, and more particularly to a rotary vane internal combustion engine.

BACKGROUND OF THE INVENTION

In conventional piston engines, the four strokes: intake, compression, power and exhaust are carried out in the same cylinder. There is a large amount of thermal energy taken away by the waste gases as high-temperature and high-pressure burning gases can not expand sufficiently in the power stroke. However, while the power acting on the top of the piston is transmitted through the piston and connecting rod, and the crankshaft, there are losses in component forces. The engine also needs exhaust valves that are in very adverse working circumstances and very difficult to cool down. They are also liable to erosion and have a short life. In addition, the driving of valves consumes engine power, and creates noise. Furthermore, there are the inertia losses as the valves and pistons are reciprocating. These inertia losses are increased with the increase of the speed of the engine and also severely affect the acceleration character and top velocity of the engine, making the engine unbalanced. Also, restricted by structure and operation principles, the air-fuel mixture is incomplete, burning time is short, and combustion is not complete. Consequently, fuel consumption is high and efficiency is low, with serious emission pollution and high noise level. What is more, with its large volume, heavy weight, complicated structure, large number of parts, high requirement for manufactured technology, high cost, and high fault rate, it is difficult to meet the modern requirements of transports and communications.

With its small volume, light weight, little inertia loss, reduced vibration and fewer moving parts, the rotary engine has been proposed as a viable alternative to the conventional piston engine. A successful example is known as the "Wankel Rotary Engine" built by the German engineer Felix Wankel in the 1950s. However, the combustion in this is far from complete, so it consumes a lot of oil, and produces heavy emission pollution.

Another type of rotary engine is the vane rotary engine, for example, in China patent application No. 91102310.0 (Published No. CN1055410A). The patent discloses an external combustion engine having the radial vane pistons. The housing, rotor and main shaft have been placed on a same axis, so the main shaft does not suffer the shearing stress as the rotor does not work in the side press situation. The process of intake-compression phase and expansion-exhaust phase is completed by taking concerted action between the rotor and the intake-compression chamber and expansion-exhaust chamber. There are two combustion chambers between the intake-compression chambers and expansion-exhaust chambers, and those chambers have been connected by a number of components such as air pipes, check valves, compressed gas pipes, gas store cells and injectors. However, the configuration is more complicated, and there a large amount of thermal losses and pressure drops while gases are moving through those pipes, valves and injectors. Also, the burning time can not be controlled efficiently, and burning efficiency is unsatisfactory. So this type of engine is far from utilization.

Other related vane rotary engines have been developed as seen, for example, in U.S. Pat. No. 5,277,158. This patent however discloses a multiple vane rotary internal combustion engine. The housing and the portion of the rotor between the adjacent vanes form the working chamber, and so the working procedure of the engine is completed within. It could be to use variety grades of petrol fuels without modifications. The wearing rate and thermal releasing area in this engine are large because of many vanes.

SUMMARY OF THE INVENTION

It is an object of this invention to provide a rotary vane engine that is simpler and more compact in construction.

It is another object of the present invention to provide a rotary vane engine that has a limited number of parts and more reliable operation.

Yet another object of the present invention is to provide an internal combustion engine that improves combustion process and emission.

Still another object of the present invention is to provide an internal combustion engine that becomes more efficient.

A further object of the present invention is to provide an internal combustion engine that is capable of using a variety of fuels.

In accordance with these objectives, the invention provides a rotary vane internal combustion engine having a housing formed by a stator and front and rear covers, within which is rotatablely mounted a rotor with four radially extending slots divided into equal parts circumferentially. Each slot slidably supports a vane, each vane having a sealing end contacted to the wall of inner space of the housing and retention ends guided in the guide tracks. There are inlets and outlets in the stator and means for guiding the vanes, and also fuel injectors, ignition devices, lubricating and cooling systems in the engine configuration.

The rotor is hollow one. The wall of inner space is made up of two pairs of symmetric arc-shaped walls that are placed opposite each other about the main axis. The wall of inner space and the peripheral wall of the rotor and the insides of the front and rear covers have formed two pairs of symmetric intake-compression chambers and power-exhaust chambers. The volume of each power-exhaust chamber is large than the volume of each intake-compression chamber. The inlets and outlets are two in number for each one, formed in the wall of the stator, and positioned at the beginnings of the intake-compression chambers and ends of the power-exhaust chambers respectively.

In the upper and lower ends of the stator, there are two symmetric cylinders. There is a rotatable combustor consisting of separated combustion chambers in the cylinders respectively. There is an approximately tangential compressed gas channel directing to the cylinder between the end of the intake-compression chamber and the cylinder to introduce swirling into the combustion chamber and a combustion gas nozzle between the beginning of power-exhaust chamber and the cylinder.

A spark hole formed in the wall of each cylinder, is positioned a certain distance from the combustion gas nozzle at the side of power-exhaust chamber. The spark plug is installed into the spark hole. The fuel injector placed on the cylinder is adjacent and approximately opposite to the compressed gas channel at the side of intake-compression chamber.

DETAILED DESCRIPTION OF THE PREFERRED EMBODIMENTS

Figure 1:
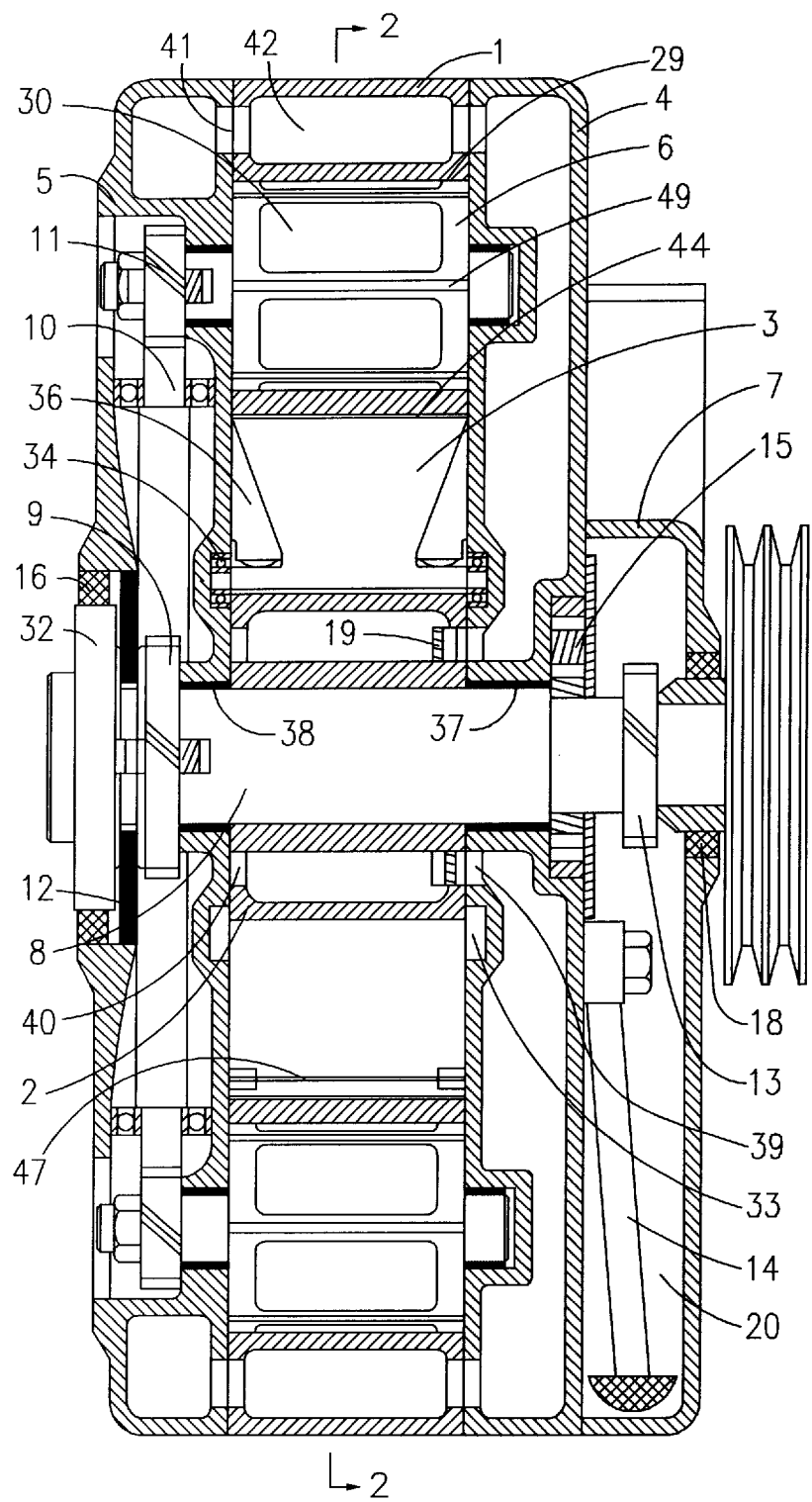
FIG. 1 is an unfolded geometrically developed view of the fragments of the rotary vane engine containing the stator, the rotor with a vane, the front and rear covers, and the timing drive set and combustors showing the position of slots of the rotor posited on both planes vertical and horizontal, taken along line 1—1 of FIG. 2, according to an embodiment of the invention.
Figure 2:
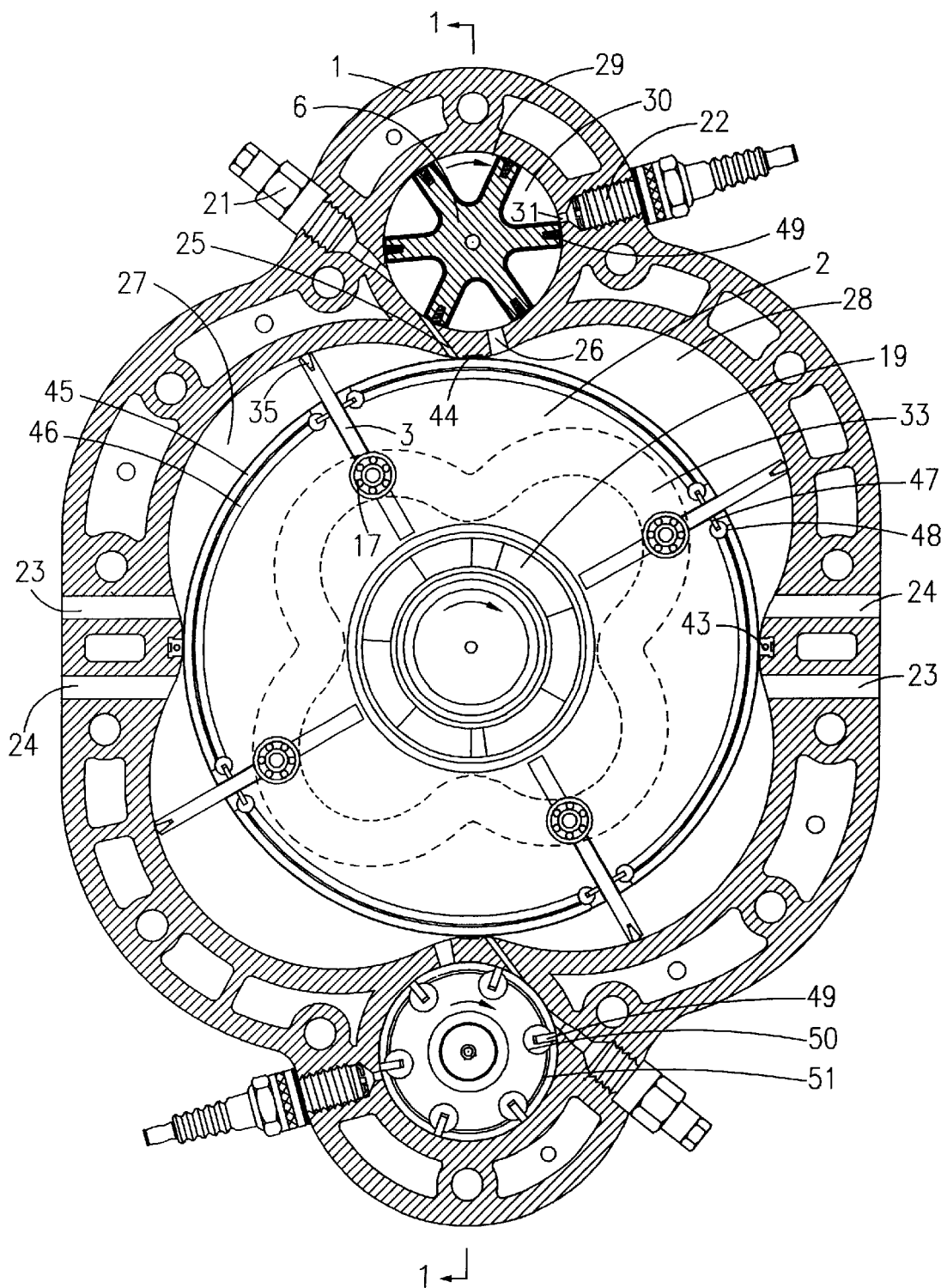
FIG. 2 is a sectional view of the rotary vane engine taken along line 2—2 of FIG. 1 according to an embodiment of the invention.

With reference to FIGS. 1 and 2, a rotary vane engine comprises a stator 1, a front cover 4 and rear cover 5, a hollow rotor 2 which is rotatably mounted within the housing formed from the stator 1 and front cover 4 and rear cover 5, a main shaft 8 that is through the center hole of the rotor 2 and supported by the main bearing 37 and 38 which are pivotally mounted in the front cover 4 and rear cover 5 respectively.

As seen best in FIG. 2, the rotor 2 has four radially extending slots which are divided into equal parts circumferentially, each slot slidably supports a vane 3 which has a sealing end contacted to the wall of inner space of the housing and retention ends guided in the guide tracks freely. The wall of inner space, which is made up of two pairs of symmetric arc-shaped walls placed opposite each other about the main axis, is together with the periphery wall of the rotor 2 and insides of the front cover 4 and rear cover 5 to form two pairs of symmetric intake-compression chambers and power-exhaust chambers respectively. Herein the volume of power-exhaust chamber 28 is larger than the volume of intake-compression chamber 27. So burned gases can get more expansion than the conventional engines. The thermal efficiency of this engine rises greatly and exhaust noise is cut down by a wide margin. Also, due to the burned gases are more expansion, the mean temperature of the burned gases in the power-exhaust chambers has dropped down, it means that thermal loss is reduced. Two pairs of inlet 23 and outlet 24 are located opposite each other in relation to the main axis through the wall of the stator 1.

A cylinder 29 is mounted in the upper end of the stator 1. A combustor 6 with six separated combustion chambers in this example is rotatably mounted in the cylinder 29. A compressed gas channel 25 is located between the end of the intake-compression chamber 27 and the cylinder 29 tangentially to the cylinder 29 for introducing strong swirling into the combustion chamber. A combustion gas nozzle 26 is positioned between the cylinder 29 and the beginning of the power-exhaust chamber 28. A spark hole 31 having a spark plug 22 installed in is placed in the wall of cylinder 29 with a certain circumferential distance from the combustion gas nozzle 26 at the side of the power-exhaust chamber 28. A fuel injector 21 is placed in the wall of the cylinder 29 opposite and adjacent to the compressed gas channel 25 at the side of the intake-compression chamber 27, thereby enhancing initial mixing of air-fuel as fuel sprays against entering air. Also, the same configuration as described above is in the lower end of the stator 1 in relation to the main axis.

When the combustion chamber 30 filled with air and fuel moves with the rotation of the combustor 6, there is an enough time for the air and fuel to mix as an ignition is not provided until the combustion chamber 30 is placed under the spark hole 31. The timing of combustion process can be initially set by way of the position of the spark hole 31 in relation to the combustion gas nozzle 26, furthermore precisely adjusted by means of turning the distributor decided on the basis of the fuel being used to ensure that the combustion time is enough. Consequently, the efficiency of the engine is increased, and the emission pollution (CO, HC, NOx) is reduced, as the air-fuel mixing and combustion have the enough times.

A timing drive set, which includes gears 9, 10, 11, is mounted in the rear cover 5, driving the combustor 6 to run correctly about the rotor 2. A rear oil seal 16 is pivotally posited in the back side of the rear cover 5. A thrust bearing 12, which bears the forces from the axial direction and fixed the position of the main shaft 8, is positioned between the gear 9 and the coupling 32.

A gear 13, which drives the distributor, is mounted on the front end of the main shaft 8 within the front end-cover 7.

An oil pump 15 driven the main shaft 8 is posited in the front-center position of the front cover 4. An inlet pipe for the oil pump 15 is put in the oil sump 20 which is formed by the front cover 4 and front end-cover 7. A front oil seal 18 is pivotally mounted on the front end-cover 7.

An axial-flow cooling pump is combined with the rotor 2, in this example, the blade 19 is positioned on the front the rotor 2. The blade 19 can also be positioned on the rear of the rotor 2.

There is a guiding means for vanes in this invention. The retention end 34 of the vane has a guide bearing 17 mounted thereon. The arc-shaped guide track 33 (dashed lines as shown in FIG. 2) with its line shape is in relation to the wall of inner space of the housing mounted in the front cover 4, same one as in the rear cover 5. The guide bearing 17 is set in the guide track 33 freely. Therefore, it ensures a certain clearance between the tip of the vane 3 and the wall of inner space of the housing during engine running.

The seal 35 placed in the tip of the vane 3 removes the clearance between the tip of the vane 3 and the wall of inner space of the housing to seal working chamber. Each flank of vane 3 has a delta-shaped sealing plate 36 to make sealing between the vane and the front and rear covers.

Now follows a detailed description of the working process of this new invention. As shown in FIG. 2, when the vane 3 together with the rotor 2 rotates clockwise, the timing drive set at the same time drives the combustor 6 the same clockwise direction as rotor 2. After air is sucked into the intake-compression chamber 27 via the inlet 23, the next vane pumps air through the compressed gas channel 25 into the combustion chamber of the combustor 6. Fuel, via filter, fuel pump, fuel line and pressure regulator (not shown in Figures), is sprayed into the combustion chamber 30. A strong vortex air flow has been generated in the combustion chamber, as the compressed gas channel 25 is in a tangential direction to the cylinder 29. Due to the fuel injector 21 being placed in approximately opposite to the compressed gas channel 25, a good premixing of air and fuel occurs on entry into combustion chamber as the fuel spays against entering air.

Before igniting on position under the spark hole 31, the air-fuel mixtures in the combustion chamber have enough time to evaporate and mix. The swirling generated by compressed air entering into the combustion chamber via the compressed gas channel 25 enhances mixing of air and fuel. Therefore, it has the capacity of burning a variety of fuels. The centrifugal effects from both the rotation of the combustion chamber and swirling make the mixture more dense at the outside of the combustion chamber. This benefits ignition, spreading flame and starting a cold engine, and also for employing a leanest burning.

After the air-fuel mixture is ignited, the combustion process will stop until the combustion gas nozzle 26 is opened. The timing of the combustion process is initially set by the position of the spark hole 31 in relation to the combustion gas nozzle 26, furthermore precisely adjusted by means of turning the distributor to meet the requirement of the used fuel. Due to the swirling, the inertia effect and the combustion occurring, on a constant volume, the efficiency of the combustion is increased.

When the combustion process is finished, the combustion gas nozzle 26 is opened, and the burned gases are forced with great pressure and temperature into the power-exhaust chamber 28 to force the vane around and drive the rotor 2. After the exhaust port 24 is opened by vane, the waste gases are expelled out of the engine by the following vane.

Both sides of each vane are under the working conditions at the same time, in the intake-compression chamber, one side of the vane is in intake phase, while the other side is pumping air into the combustion chamber through the compressed gas channel. In the power-exhaust chamber, one side of the vane is being forced by burned gases, while the other side is expelling waste gases out of the engine. If we think about combining the operation of the intake-compression chamber with the combustor and power-exhaust chamber and rotor and vanes, we find that, each working cycle, intake, compression, firing and power, exhaust, is continuous.

In this example, there are two intake-compression chambers, two power-exhaust chambers and four vanes which operate symmetrically about the main axis, making the operation of engine quite smooth. The fact is that, in the single unit it provides 8 thermodynamic cycles in a complete revolution of the rotor as in a conventional 16 cylinders four stroke engine. While two opposed vanes are in intake and compression phases, the other two vanes are in power and exhaust phases, so the inertia effect from the rotor rotating can sustain the operation of the engine, and therefore a flywheel is not required.

The cooling water enters into the water jacket of the front cover 4 via the inlet (not shown in Figures), flowing out from the outlet 39, then being propelled into the rotor 2 by the blade 19 to cool the rotor 2 and running out from the outlet 40 of the rotor 2, and entering into the rear cover 5 via inlet (not shown in Figures), and then leaving from the outlet 41 of the rear cover 5 to enter into the water jacket 42 of the stator 1, and then backing into the front cover 4, and flowing out though the outlet (not shown in Figures) of the front cover 4.

Oil is pumped into the oil filter (not shown in Figures) after being sucked into the oil pump 15 via inlet pipe 14, then carried to each point which requires lubricating through a series of oil lines (not shown in Figures), and finally back into the oil sump 20 via oil back passages (not shown in Figures).

The seals 43, 44, 45, 46, 47, 49, 51 and corner seals 48, 50 are used to ensure working chamber sealing.

This invention can be constructed as two or even more units in line.

What is claimed is:

1. A rotary vane engine, comprising:

a housing formed by a stator and a front and rear covers, said housing enclosing an inner space;

a rotor having four radially extending slots divided into equal parts circumferentially rotatably mounted within said inner space with same main axis of said housing, each of said slots receiving a radially slidable vane, each vane having a sealing end contacted to the wall of said inner space and two retention ends with the bearings guided in guide tracks individually;

said wall of said inner space being made up of two pairs of arc-shaped walls which are placed opposite each other with respect to the main axis and together with the periphery wall of said rotor, both sides of the vanes and the front and rear covers forming two pairs of symmetric intake-compression chambers and power-exhaust chambers respectively;

a pair of inlets formed in said stator, said pair of inlets being positioned at the beginnings of said intake-compression chambers and passing through the wall of said stator respectively symmetrically with respect to the main axis;

a pair of outlets formed in said stator, said outlets being positioned at the ends of said power-exhaust chambers and passing through the wall of said stator respectively symmetrically with respect to the main axis;

a pair of symmetric cylinders with respect to the main axis formed in the upper and lower ends of said stator respectively;

a pair of combustors, each of said combustors consisting of two separated combustion chambers and rotatably mounted within said cylinders respectively;

a compressed gas channel formed between each of said cylinders and adjacent end of the intake-compression chamber substantially tangential to the cylinder;

a combustion gas nozzle formed between each of said cylinders and adjacent beginning of the power-exhaust chamber;

a spark hole formed in the wall of each of said cylinders with a certain circumferential distance from said combustion gas nozzle at the side of the power-exhaust chamber;

a fuel injector mounted in the wall of each of said cylinders adjacent and roughly opposite to said compressed gas channel at the side of the intake-compression chamber;

a spark plug installed in each said spark hole;

means for guiding the vanes; and a lubricating system, and a cooling system;

whereby said rotor is a hollow one; and whereby the volume of each of said power-exhaust chambers is larger than the volume of each said intake-compression chambers.

2. A rotary vane engine as recited in claim 1, wherein said lubricating system comprises a gear type of oil pump pivotally mounted in the front of said front cover.

3. A rotary vane engine as recited in claim 1, wherein said cooling system comprises an axial flow cooling pump pivotally mounted in said rotor.

4. A rotary vane engine as recited in claim 3, wherein the blades of said cooling pump are pivotally positioned in the front of said rotor.

5. A rotary vane engine as recited in claim 3, wherein the blades of said cooling pump are pivotally positioned in the rear of said rotor.

6. A rotary vane engine as recited in claim 1, wherein:

said means for guiding the vanes comprises, bearings mounted on the retention ends of said vanes and two curve-shaped guide tracks with its line shape in relation to curve-shaped wall of inner space of said housing formed in the inside of said front cover and rear cover respectively, said retention ends of each of said vanes with the bearings set in said curve-shaped guide tracks thereby to ensure appropriate clearance between the tip of each of said vanes and said curve-shaped wall of inner space of said housing;

said tip of each of said vanes has a seal to eliminate said clearance thereby to ensure the sealing of the working chambers.

7. A rotary vane engine as recited in one of claims 1 to 6, wherein each said vane has two triangular sealing plates individually installed between said vane and front and rear covers to ensure the sealing of the working chamber.

8. A rotary vane engine as recited in one of claims 1 to 7, which can be organized into two or more rotors inline.

\* \* \* \* \*